United States Patent
Honda et al.

(10) Patent No.: US 8,279,902 B2
(45) Date of Patent: Oct. 2, 2012

(54) LASER DEVICE THAT STABLY CONTROLS VERY LOW LASER POWER

(75) Inventors: Masahiro Honda, Minamitsuru-gun (JP); Koji Hayano, Minamitsuru-gun (JP); Atsushi Mori, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/039,715

(22) Filed: Mar. 3, 2011

(65) Prior Publication Data

US 2011/0243165 A1 Oct. 6, 2011

(30) Foreign Application Priority Data

Apr. 5, 2010 (JP) .................................. 2010-087047

(51) Int. Cl.
*H01S 3/00* (2006.01)
*H01S 3/13* (2006.01)
(52) U.S. Cl. ............ 372/29.021; 372/29.012; 372/38.04
(58) Field of Classification Search ............. 372/29.012, 372/29.021, 38.04
See application file for complete search history.

(56) References Cited

U.S. PATENT DOCUMENTS
2006/0280213 A1    12/2006   Egawa et al.

FOREIGN PATENT DOCUMENTS
| DE | 3541876 C2 | 12/1989 |
| DE | 60 2004 000 574 T2 | 8/2006 |
| DE | 43 31 054 B4 | 9/2007 |
| EP | 1 732 185 | 12/2006 |
| JP | 61-204991 | 9/1986 |
| JP | 2006-344722 | 12/2006 |

*Primary Examiner* — Armando Rodriguez
(74) *Attorney, Agent, or Firm* — Drinker Biddle & Reath LLP

(57) ABSTRACT

A laser device comprises: first and second laser excitation regions that are disposed in series each other; a first power supply unit (PSU1) that injects a first energy into the first laser excitation region; and a second power supply unit (PSU2) that injects a second energy into the second laser excitation region, wherein the first power supply unit injects a predetermined excitation energy equal to or higher than a critical injection energy at which laser oscillation starts into the first laser excitation region as the first energy and the second power supply unit injects energy between a preliminary excitation energy needed for preliminary discharge and the critical injection energy into the second laser excitation region as the second energy, so as to control laser power. Consequently, the laser device can stably output very low laser even though it is a high power laser.

4 Claims, 9 Drawing Sheets

LASER DEVICE THAT STABLY CONTROLS VERY LOW LASER POWER

RELATED APPLICATION DATA

This application claims priority under 35 U.S.C. §119 and/or §365 to Japanese Application No. 2010-087047 filed Apr. 5, 2010, the entire contents of which is incorporated herein by reference.

BACKGROUND OF THE INVENTION

1. Field of the Invention

The present invention relates to a laser device that controls laser power. In particular, it relates to a laser device that stably controls very low laser power.

2. Description of the Related Art

Typically, the power of a high power laser device is as much as several kW. As publicly known, such high power laser is used for cutting thick plates, deep penetration welding and the like.

On the contrary, the laser device can output very low laser of 10% or less of nominal power. When a very low laser is output, it is possible to laser mark characters on a workpiece surface, drawing index lines used in the next stage and the like or modify the workpiece surface without melting the workpiece surface.

For example, when a laser cutting machine comprising a laser oscillator whose nominal power is 6 kW is configured for an average power of 4.5 kW at a pulse frequency of 700 Hz using oxygen assist gas, it can cut a steel plate of 30 mm thickness with feed speed of 550 mm/min. In addition, when such laser cutting machine is configured for an power of 50 W±10 W at a pulse frequency of 1000 Hz using the oxygen assist gas, laser marking can be performed on a steel plate surface with feed speed of 5000 mm/min.

However, when a very low laser of 10% or less of the nominal power is output, the laser device is sensitive to an external environment and temperature inside it and therefore the laser power tends to become unstable. This is because, in a region in which a very low laser is output, laser oscillation vary sensitively in response to injection of excitation energy.

In the above-mentioned laser oscillator whose nominal power is 6 kW, the energy injected into a laser medium to obtain the nominal power corresponds to 30 kW. Consequently, thermal conditions of the laser resonator including the laser medium and optics differ between before and after the nominal power is reached. In such circumstances, the very low laser power of 10% or less of the nominal power is severely affected by the thermal conditions of the laser oscillator and, as a result, the laser power becomes unstable.

In this regard, in Japanese Unexamined Patent Publication No. 2006-344722, in each of a plurality of laser excitation regions, discharge phase, duty cycle and pulse frequency are controlled differently from each other so that the very low laser power can be stably controlled.

However, the configuration disclosed in Japanese Unexamined Patent Publication No. 2006-344722 into consideration the plurality of laser excitation regions is essentially the same as the configuration in which a plurality of portions in one excitation region are selectively excited. Consequently, a ratio of variation of the laser power to the injection energy for the laser excitation is not changed. Thus, because the very low laser power sensitively responds to the variation of command values, also in Japanese Unexamined Patent Publication No. 2006-344722, there still remains a problem that it is difficult to control the very low laser power.

The present invention has been made in light of these circumstances and an object of the present invention is to provide a laser device with improved controllability that can stably output very low laser even though it is a high power laser.

SUMMARY OF THE INVENTION

In order to achieve the above object, according to a first aspect, there is provided a laser device comprising: first and second laser excitation regions that are disposed in series each other; a first power supply unit that injects a first energy into the first laser excitation region; and a second power supply unit that injects a second energy into the second laser excitation region, wherein the first power supply unit injects a predetermined excitation energy equal to or higher than a critical injection energy at which laser oscillation starts into the first laser excitation region as the first energy and the second power supply unit injects energy between a preliminary excitation energy needed for preliminary discharge of the discharge tube and the critical injection energy into the second laser excitation region as the second energy, so as to control laser power.

According to a second aspect, there is provided a laser device comprising a power supply unit that injects energy into a laser excitation region, wherein the power supply unit injects the energy in a pulse-like manner between a first energy and a second energy that is lower than the first energy, the first energy is a predetermined excitation energy equal to or higher than a critical injection energy at which laser oscillation starts and the second energy is between a preliminary excitation energy needed for preliminary discharge of the discharge tube and the critical injection energy, and the power supply unit changes the second energy between the preliminary excitation energy and the critical injection energy, so as to control laser power.

According to a third aspect, in the first or second aspect, the second energy is set by adding or subtracting a predetermined offset excitation energy to/from the preliminary excitation energy.

According to a fourth aspect, in the first or second aspect, the laser device further comprises a storage section that stores, as a data table or function, a corresponding relationship between a target value of the laser power, the first energy, and a second energy determined according to the target value of the laser power and the first energy, wherein the second energy is determined based on the target value of the laser power, the first energy set forth in programs for operating the laser device, and the data table or function stored by the storage section.

According to a fifth aspect, in the first or second aspect, the laser device further comprises: a command creation section that creates command values of the first and second energies corresponding to a target value of the laser power; a power detection section that obtains a detection value of the laser output from the laser device; and a command computation section that updates the command value of the second energy according to a predetermined computation based on the command values of the first and second energies created by the command creation section and the detection value of the laser detected by the power detection section.

These and other objects, features and advantages of the present invention will be more apparent in light of the detailed description of exemplary embodiments thereof as illustrated by the drawings.

DETAILED DESCRIPTION

Figure 1:
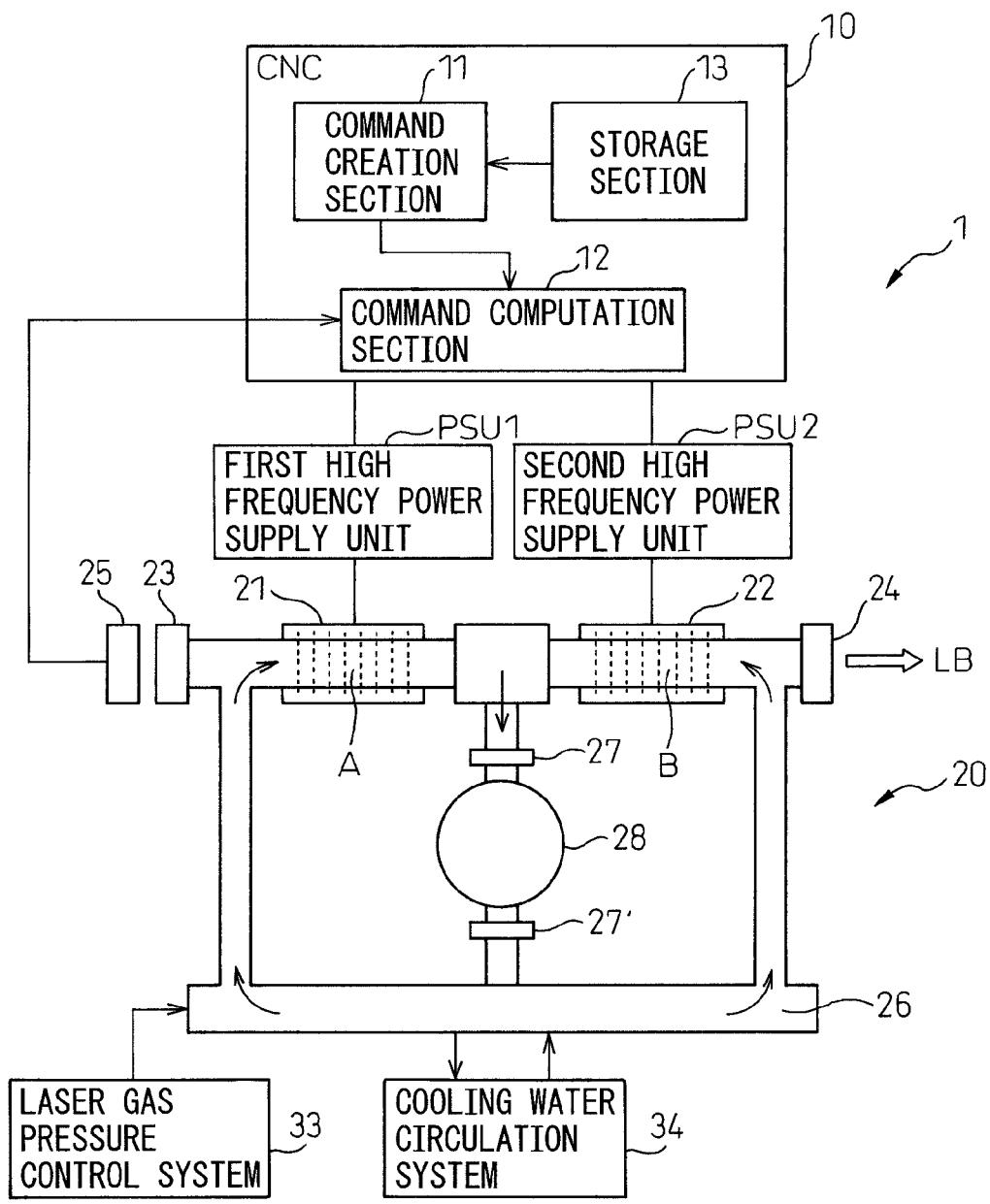
FIG. 1 is a schematic diagram illustrating a general configuration of a laser device according to the present invention.

Hereinafter, embodiments of the present invention will be described with reference to the accompanying drawings. In the drawings, like members are designated by like reference numerals. For ease of understanding, the scale of these drawings is changed appropriately.

FIG. 1 is a schematic diagram illustrating a general configuration of a laser device according to the present invention. As publicly known, typically, laser power is increased or decreased by increasing or decreasing an injection energy into a plurality of excitation regions of the laser device. In this case, the energy may be applied simultaneously to all the excitation regions, or it may be applied sequentially to the plurality of excitation regions. In the case of a gas laser as in the present invention, the excitation regions are formed in an electric discharge tube. However, the present invention is not limited to the gas laser and a solid laser may be applied. In the case of the solid laser, it is to be noted that the excitation regions are formed in a crystal rod or optical fiber. Hereinafter, the case in which the gas laser is used will be described.

Laser device 1 illustrated in FIG. 1 mainly includes a CNC 10, and a laser oscillator 20. Laser oscillator 20 is a discharge excitation laser that outputs relatively high power. This laser oscillator 20 includes a discharge tube 26 in which a rear mirror 23 and an output mirror 24 are disposed oppositely to each other. Here, output mirror 24 is partially transparent and its transmittance is about 20% to 80%. In addition, rear mirror 23 is hardly transparent and its transmittance is as little as 0.1%.

Further, a laser power sensor 25 is disposed behind rear mirror 23. A laser light taken out of rear mirror 23 is detected by laser power sensor 25 and its laser detection value Pm is input to a command computation section 12 of CNC 10.

In FIG. 1, two discharge electrode pairs 21 and 22 are provided in an optical resonance space between rear mirror 23 and output mirror 24 and disposed to sandwich discharge tube 26. These discharge electrode pairs 21 and 22 are disposed in series each other on discharge tube 26. These discharge electrode pairs 21 and 22 have identical dimensions and are covered with dielectric coating. In this patent specification, a space between discharge electrode pairs 21 is referred to as a first laser excitation region A and a space between discharge electrode pairs 22 is referred to as a second laser excitation region B.

Further, these discharge electrode pairs 21 and 22 are connected to a first high frequency power supply unit PSU1 and a second high frequency power supply unit PSU2, respectively. Matching circuits (not illustrated) are provided between discharge electrode pairs 21 and 22 and first and second high frequency power supply units PSU1 and PSU2, respectively.

Then, first and second high frequency power supply unit PSU1 and PSU2 are connected to CNC 10. Excitation energies Em and Es supplied to first and second laser excitation regions A and B are controlled by CNC 10 and high frequency power supply units PSU1 and PSU2, respectively.

As illustrated in FIG. 1, a blower 28 is disposed in discharge tube 26 and heat exchangers 27 and 27' are disposed in the upstream and downstream of blower 28, respectively. Further, laser oscillator 20 is connected to a cooling water circulation system 34 so that laser gas and the like in discharge tube 26 can be appropriately cooled. Still further, a laser gas pressure control system 33 can supply the laser gas to discharge tube 26 and discharge the laser gas from discharge tube 26.

CNC 10 is a digital computer that controls overall operations of laser oscillator 20. As illustrated, CNC 10 acts as a command creation section 11 that creates command values of first and second excitation energies Em and Es corresponding to a target value of laser power Pt. Further, CNC 10 acts as a command computation section 12 that updates the command value of the second excitation energy Es according to predetermined computation based on the command values of the first and second excitation energies Em and Es created by command creation section 11 and the laser detection value Pm detected by laser power sensor 25.

Further, CNC 10 includes a storage section 13 that stores in advance, as a data table or function, a corresponding relationship between the target value of the laser power Pt, the excitation energy Em for the first laser excitation region A, and a command value of the excitation energy Es for the second laser excitation region B that is determined according to the excitation energy Em for the first laser excitation region A and the target value of the laser power Pt. This storage section 13 also stores operation programs and various data for operating laser apparatus 1. In the operation programs, the command value of the excitation energy Em for the first laser excitation region A is written in advance.

Figure 2:
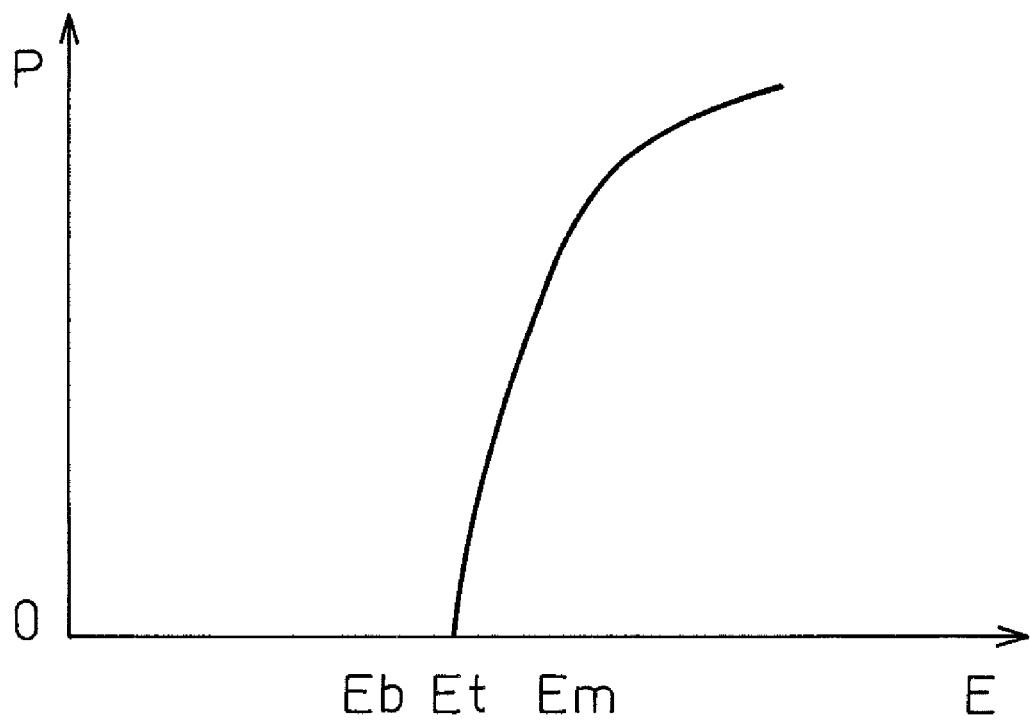
FIG. 2 is a diagram illustrating a relationship between energy E injected into one laser excitation region and laser power P.

FIG. 2 is a diagram illustrating a relationship between energy E injected into one laser excitation region and the laser power P. As illustrated in FIG. 2, when the energy E is low, the laser power P is not generated. When the energy E reaches a critical injection energy Et, laser oscillation starts and the laser power P is obtained. It can be considered that the amplified laser light is in balance with the laser light lost in a resonator. Then, as illustrated in FIG. 2, as the excitation energy higher than the critical injection energy, for example the excitation energy Em, is injected, the laser power P increases accordingly.

In many laser devices that are practically used at present, a preliminary excitation energy Eb that is lower than the critical injection energy Et has to be injected into the laser excitation regions A and B in advance or at all times. In the preliminary excitation energy Eb, the laser power P is not generated. But, by injecting the preliminary excitation energy Eb as described above, a discharge state in discharge tube 26 can be maintained and the laser power value can be prevented from overshooting in transient characteristics when the laser is output. The technique to inject the preliminary excitation energy Eb as described above may be referred to as preliminary discharge or simmer discharge.

Figure 3A:
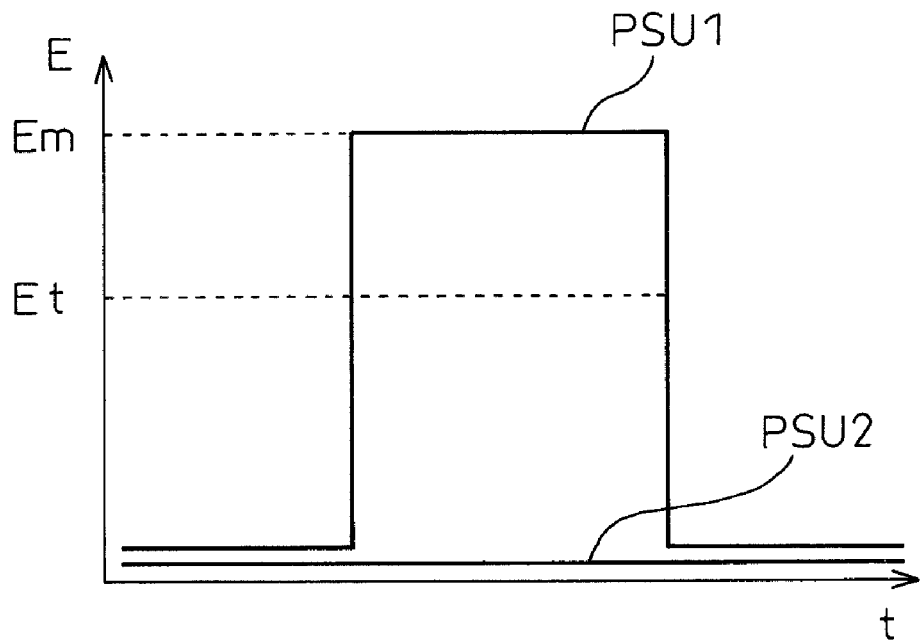
FIG. 3a is a diagram illustrating a relationship between time t and the injection energy E in the conventional art.
Figure 3B:
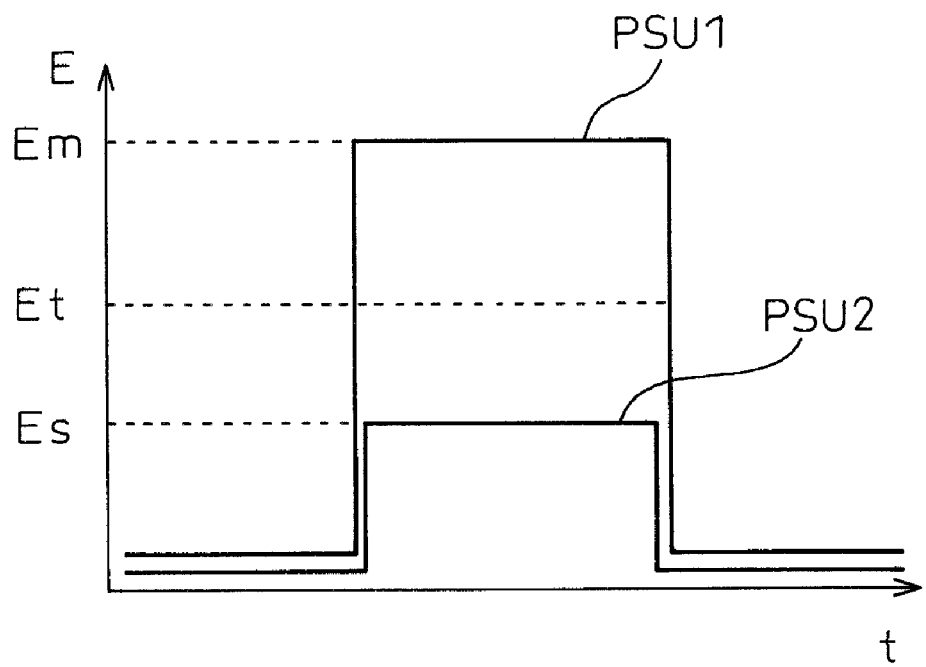
FIG. 3b is a diagram illustrating a relationship between the time t and the injection energy E in a first embodiment of the present invention.

FIGS. 3a and 3b are diagram illustrating a relationship between time t and the injected energy E in the conventional art and a first embodiment of the present invention, respectively. In these figures, the horizontal axis represents the time t and the vertical axis represents the energy E injected into the laser excitation regions A and B.

Hereinafter, referring to these figures, an operation of the laser device according to the first embodiment of the present invention will be described. As illustrated in FIG. 3a, in the conventional art, the excitation energy Em in the first laser excitation region A is higher than the critical injection energy Et and the excitation energy Es is not injected into the second laser excitation region B.

Figure 4A:
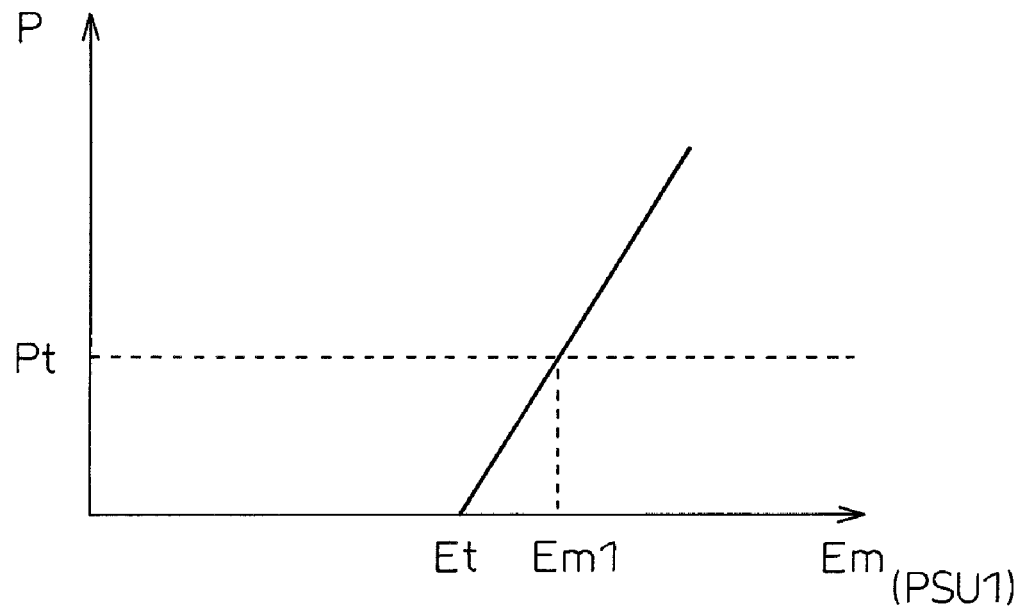
FIG. 4a is a diagram illustrating a relationship between energy Em in a first laser excitation region and the laser power P when energy. Es in a second laser excitation region is fixed at a critical injection level Et in the conventional art.

FIG. 4a is a diagram illustrating a relationship between the excitation energy Em in the first laser excitation region A and the laser power P when the excitation energy Es in the second laser excitation region B is fixed at the critical injection energy Et in the conventional art. As can be seen from FIG. 4a, while injecting the critical injection energy Et into the second laser excitation region B, when an amount of the excitation energy Em1 is injected into the first laser excitation region A, the target laser power Pt is obtained. Then, as illustrated, when the excitation energy Em in the first laser excitation region A is equal to or higher than the critical injection energy Et, the laser power P changes linearly.

However, as illustrated, an angle between the horizontal axis representing the energy Em and the relational expression is relatively large. Consequently, if the excitation energy Em in the first laser excitation region A is changed slightly, the laser power P changes significantly. As a result, in particular, when the excitation energy Em in the first laser excitation region A is close to the critical injection energy Et, it is difficult to generate the very low laser power P.

On the contrary, in the first embodiment of the present invention, as illustrated in FIG. 3b, while making the excitation energy Em in the first laser excitation region A higher than the critical injection energy Et, the excitation energy Es equal to or lower than the critical injection energy Et is injected into the second laser excitation region B. The excitation energy Es in the second laser excitation region B is higher than the preliminary excitation energy Eb.

Figure 4B:
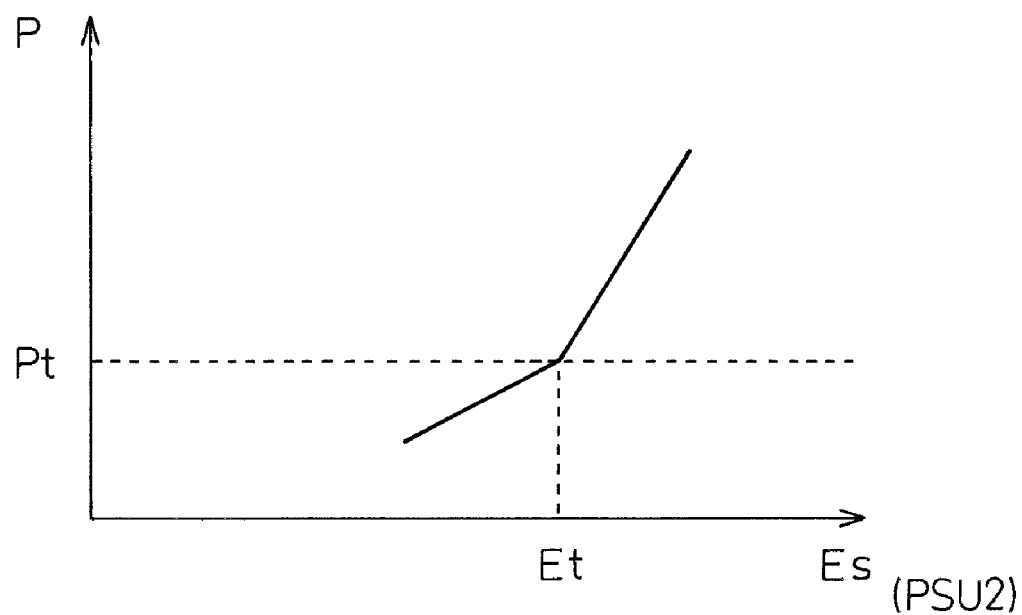
FIG. 4b is a diagram illustrating a relationship between the energy E in the second laser excitation region and the laser power P when the energy Em in the first laser excitation region is fixed at a value higher than the critical injection energy Et in the first embodiment of the present invention.

Then, FIG. 4b is a diagram illustrating a relationship between the excitation energy Es in the second laser excitation region B and the laser power P when the excitation energy Em in the first laser excitation region A is fixed at a value higher than the critical injection energy Et in the first embodiment of the present invention. As illustrated in FIG. 4b, in the first embodiment, a rate of change of the laser power P differs depending on whether the excitation energy Es in the second laser excitation region B is equal to or higher than the critical injection energy Et or not.

More specifically, the rate of change of the laser power P when the excitation energy Es in the second laser excitation region B is lower than the critical injection energy Et is lower than the rate of change of the laser power P when the excitation energy Es in the second laser excitation region B is equal to or higher than the critical injection energy Et.

Thus, in the present invention, in a region where the laser power P is relatively low, the laser output changes relatively slowly with respect to the energy E. Consequently, when the excitation energy Es in the second laser excitation region B is lower than the critical injection energy Et, the very low laser power P can be stably generated and easily fine-tuned. In this case, it can be understood that, even if laser oscillator 20 is exposed to thermal variation, the laser power P is affected little by the thermal variation.

In the first embodiment, laser oscillator 20 has two high frequency power supply units PSU1 and PSU2, and the two laser excitation regions A and B corresponding to them, respectively. However, depending on the type of laser device 1, laser oscillator 20 may have only one high frequency power supply unit and only one laser excitation region. In the laser device 1 in a second embodiment described below, high frequency power supply unit PSU2 and the second laser excitation region B do not exist.

Figure 5A:
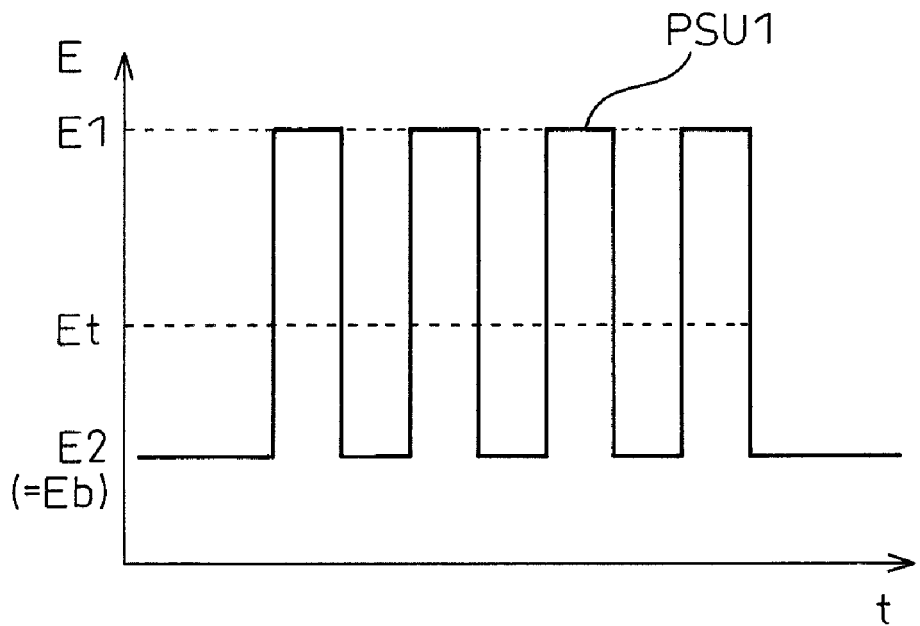
FIG. 5a is another diagram illustrating a relationship between the time t and the injection energy E in the conventional art.
Figure 5B:
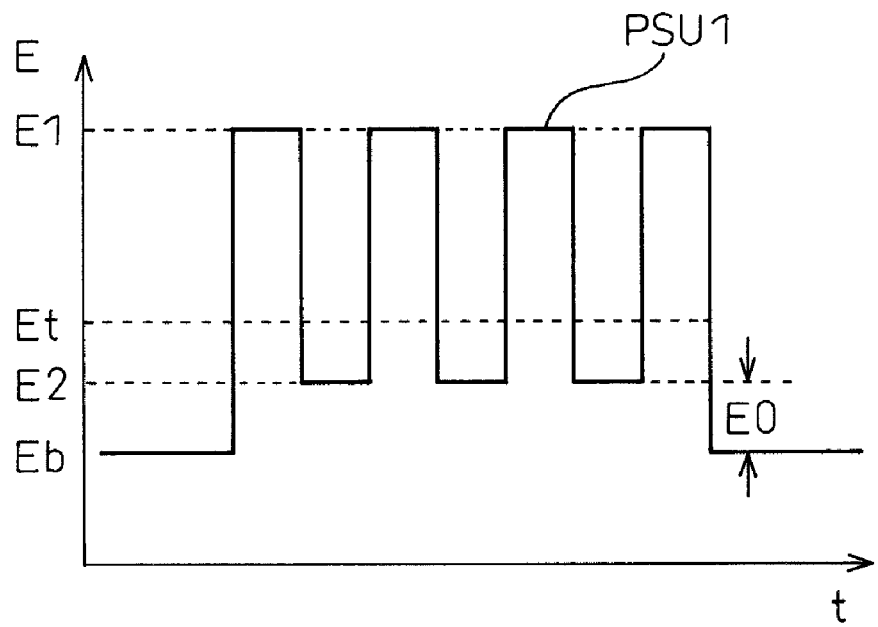
FIG. 5b is a diagram illustrating a relationship between the time t and the injection energy E in a second embodiment of the present invention.

FIGS. 5a and 5b are diagrams illustrating a relationship between the time t and the energy E in the conventional art and the second embodiment of the present invention, respectively. In these figures, a high energy E1 and a low energy E2 are alternately input in a pulse-like manner.

The high energy E1 in the conventional art illustrated in FIG. 5a is higher than the critical injection energy Et and the low energy E2 corresponds to the preliminary excitation energy Eb. In the conventional art, by changing the high energy E1 in the region higher than the critical injection energy Et, the laser power P is controlled.

Figure 6A:
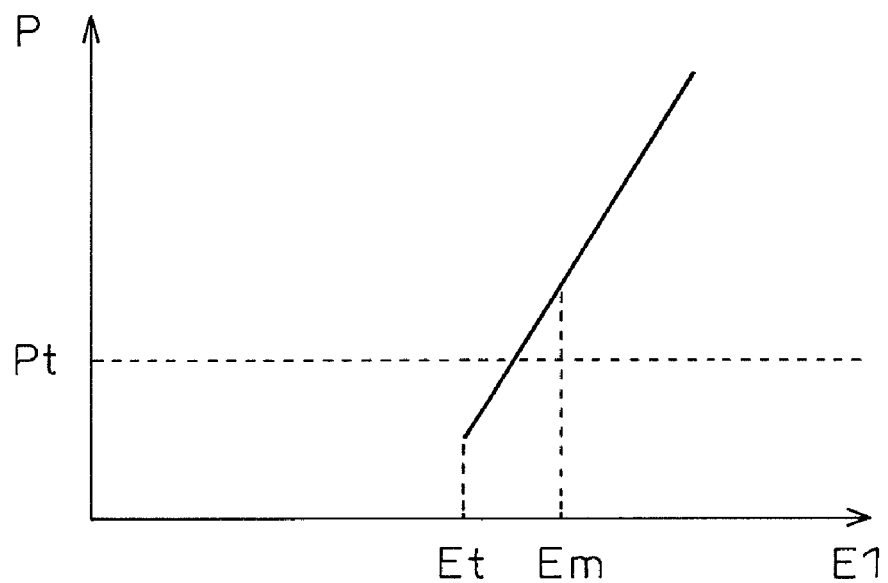
FIG. 6a is a diagram illustrating a relationship between high energy E1 and the laser power P when the high energy is changed in a region equal to or higher than the critical injection level Et while a low energy is fixed at a preliminary excitation energy Eb.

In addition, FIG. 6a is a diagram illustrating a relationship between the energy E and the laser power P when the high energy E1 is changed in a region equal to or higher than the critical injection energy Et while the low energy E2 is fixed at the preliminary excitation energy Eb. As illustrated in FIG. 6a, when the high energy E1 is equal to or higher than the critical injection energy Et, the laser power P changes linearly. However, also in this case, an angle between the horizontal axis representing the high energy E1 and the relational expression is relatively large and the problems similar to those described above arise.

In contrast, in the second embodiment illustrated in FIG. 5b, the low energy E2 is changed between the preliminary excitation energy Eb and the critical injection energy Et while the high energy E1 is fixed at a value equal to or higher than the critical injection energy Et. As can be seen from FIG. 5b, a deviation of the low excitation energy Es with respect to the preliminary excitation energy Eb may be referred to as deviation energy E0.

Figure 6B:
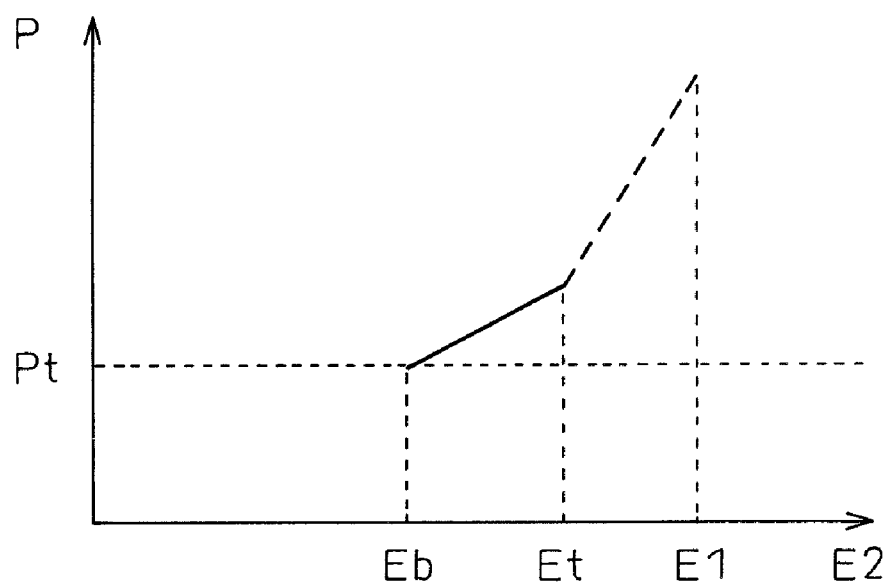
FIG. 6b is a diagram illustrating a relationship between the low energy E2 and the laser power P when the low energy E2 is changed between the preliminary excitation energy Eb and the critical injection energy Et while the high energy E1 is fixed at a value equal to or higher than the critical injection energy Et in the second embodiment of the present invention.

Then, FIG. 6b is a diagram illustrating a relationship between the low energy E2 and the laser power P when the low energy E2 is changed between the preliminary excitation energy Eb and the critical injection energy Et while the high energy E1 is fixed at a value equal to or higher than the critical injection energy Et.

As illustrated in FIG. 6b, the rate of change of the laser power P when the low energy E2 is lower than the critical injection energy Et is lower than the rate of change of the laser power P when the low energy E2 is between the critical injection energy Et and the high energy E1. Consequently, also in the second embodiment, it can be seen that, when the low energy E2 is lower than the critical injection energy Et, the very low laser power P can be stably generated and easily fine-tuned.

Figure 7A:
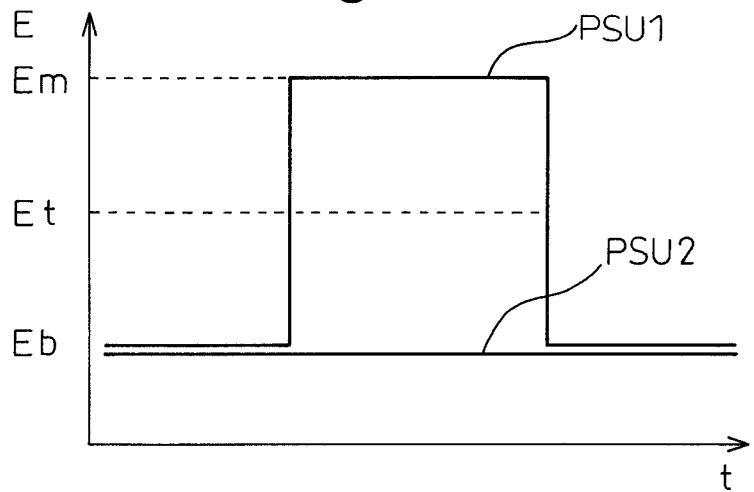
FIGS. 7a to 7c are diagrams illustrating a relationship between the time t and the energy E when the preliminary excitation energy Eb is injected into the first and second laser excitation regions.
Figure 7B:
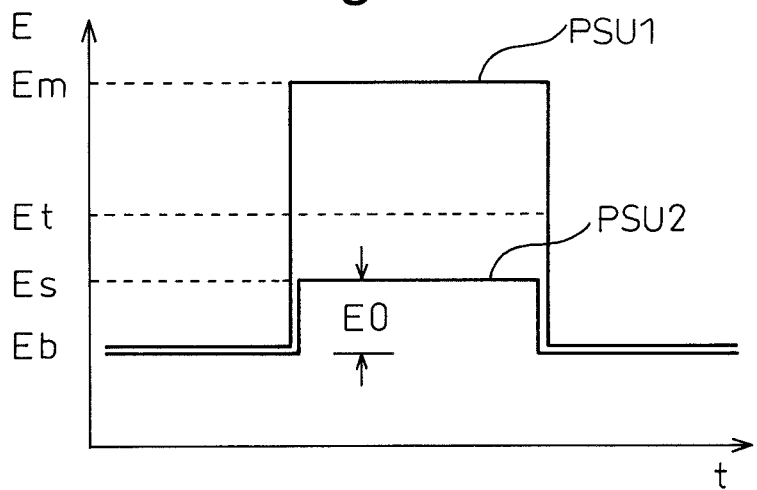
Figure 7C:
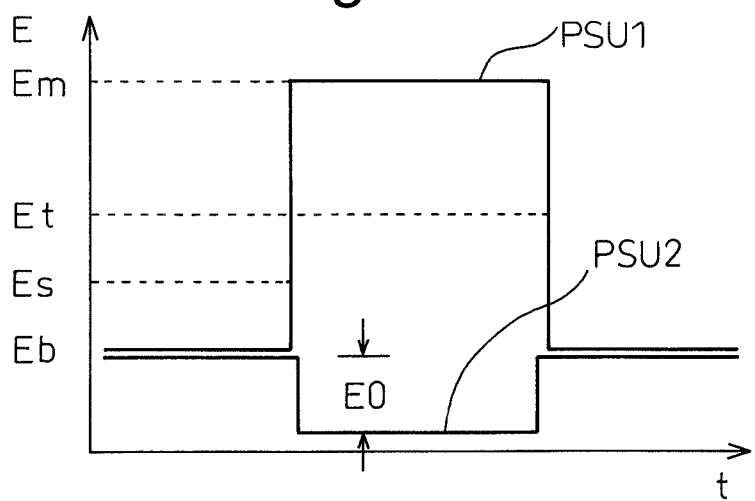

FIGS. 7a to 7c are diagrams similar to FIG. 3b illustrating a relationship between the time t and the energy E when the preliminary excitation energy Eb is injected into the first and second laser excitation regions A and B. When the energy is injected into the first and second laser excitation regions A and B as described above, the laser power P can be changed by increasing the energy injected into the laser excitation region B by the deviation energy E0 (FIG. 7b) or decreasing it by the deviation energy E0 (FIG. 7c).

Also in these cases, similarly, it can be seen that the very low laser power P can be stably output and easily fine-tuned. This is particularly advantageous when the second energy has to be made relatively high. The technique illustrated in FIGS. 7a to 7c can be applied to both the first and second embodiments described above.

As described above, in FIG. 4a, when the excitation energy Es in the second laser excitation region B is fixed at the critical injection energy Et, the excitation energy Em in the first laser excitation region A is changed. On the contrary, in FIG. 4b, when the excitation energy Em in the first laser excitation region A is fixed at a value higher than the critical injection energy Et, the excitation energy Es in the second laser excitation region B is changed.

As can be seen from FIGS. 4a and 4b, the laser power in these cases is not proportional to a total value of the energy injected into first and second laser excitation regions A and B. In other words, it is difficult to uniquely calculate the first and second energies based on the laser power.

Consequently, in the present invention, as illustrated in the table set forth below, a corresponding relationship between the target value of the laser power Pt, the excitation energy Em for the first laser excitation region A, and a command value of the excitation energy Es for the second laser excitation region B that is determined according to the excitation energy Em for the first laser excitation region A and the target value of the laser power Pt is stored in advance in storage section 13 of CNC 10 as a data table or function. Contents of this data table are created experimentally or otherwise. The table 1 set forth below illustrates that a part of this corresponding relationship is stored as the data table.

| Condition No. | Target laser power Pt | First excitation energy Em | Second excitation energy Es |
| --- | --- | --- | --- |
| Condition 1 | 50 W | 2000 W | 1600 W |
| Condition 2 | 100 W | 2000 W | 1700 W |
| Condition 3 | 150 W | 2000 W | 1780 W |
| Condition 4 | 50 W | 2100 W | 1610 W |
| Condition 5 | 100 W | 2100 W | 1670 W |

In the programs for operating laser device 1, the command value of the excitation energy Em injected into the first laser excitation region A is written. Consequently, once the target value of the laser power Pt is determined, the command value of the excitation energy Es to be injected into the second laser excitation region B is determined automatically based on the programs and the data table.

Typically, the target value of the laser power Pt is determined first and, then, the command value of the excitation energy Es to be injected into the second laser excitation region B is determined from the command value of the excitation energy Em injected into the first laser excitation region A written in the programs. As described above, in the present invention, the second excitation energy Es can be determined simply by using the data table. Alternatively, the command value of the excitation energy Es may be determined from the "Condition numbers" written on the left of the table 1.

The target values of the laser power Pt in Conditions 4 and 5 of Table 1 are same as the target values of the laser power Pt in Conditions 1 and 2, respectively. However, because the command values of the excitation energy Em in the first laser excitation region A in these conditions are different from each other, the command values of the excitation energy Es in the second laser excitation region B are also different. In other words, in order to determine the excitation energy Es in the second laser excitation region B, both the laser power Pt and the excitation energy Em in the first laser excitation region A are needed.

Figure 8:
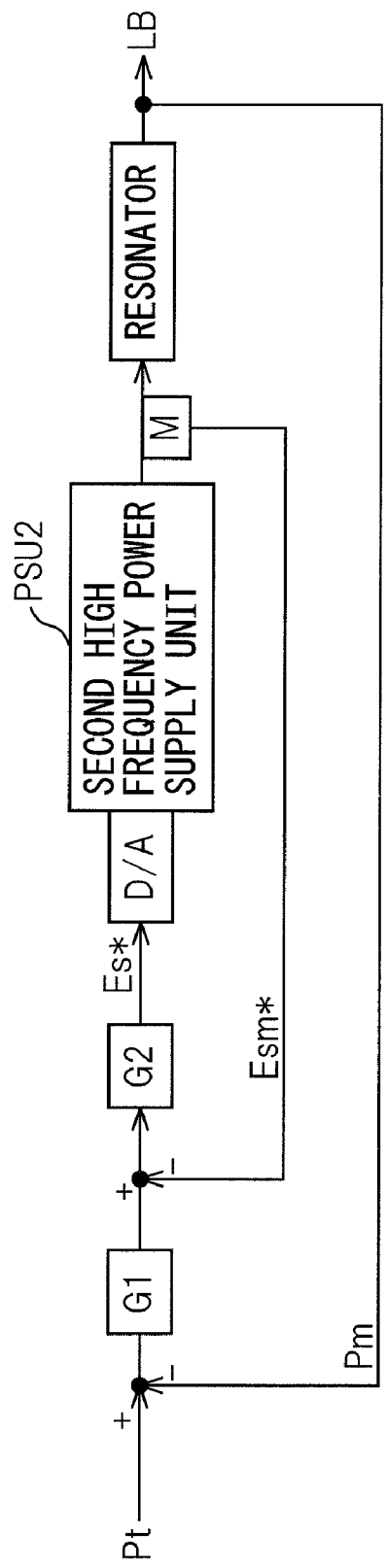
FIG. 8 is a functional block diagram in relation to a second high frequency power supply unit.

FIG. 8 is a functional block diagram in relation to a second high frequency power supply unit. Given an output condition Lx and the target value of the laser power Pt, CNC 10 calculates a command value Em* of the energy in the first laser excitation region A according to a predetermined formula. Alternatively, a command value Em* of the energy in the first laser excitation region A written in the programs of laser device 1 may be adopted.

Then, in the present invention, a feedback circuit illustrated in FIG. 8 is used to calculate the command value Es* of the energy to be injected into the second laser excitation region B. As a result, the energies according to the command values Em* and Es* are injected into the first and second laser excitation regions A and B, respectively.

As illustrated in FIG. 8, a difference between the command value of the laser power Pt and the laser detection value Pm detected by laser power sensor 25 is multiplied by a gain G1. Because intensity of the laser light output from output mirror 24 is proportional to the laser detection value Pm, the value of the laser power can be given to CNC 10 by multiplying the laser detection value Pm by a predetermined coefficient.

Then, by subtracting the detection value Esm* of the injection energy detected by a monitor M and, further, multiplying a gain G2, the command value of the excitation energy Es to be injected into the second laser excitation region B is determined. This computation may be performed by command computation section 12.

In other words, in the embodiment illustrated in FIG. 8, the command value of the second excitation energy Es is determined according to the following equation:

$$Es^* = G2 \times (G1 \times (Pt - Pm) - Esm^*)$$

As can be seen from this equation, the laser power quickly increases and decreases by the effect of Es* and the intensity of laser power Pt approaches the command value.

Figure 9:
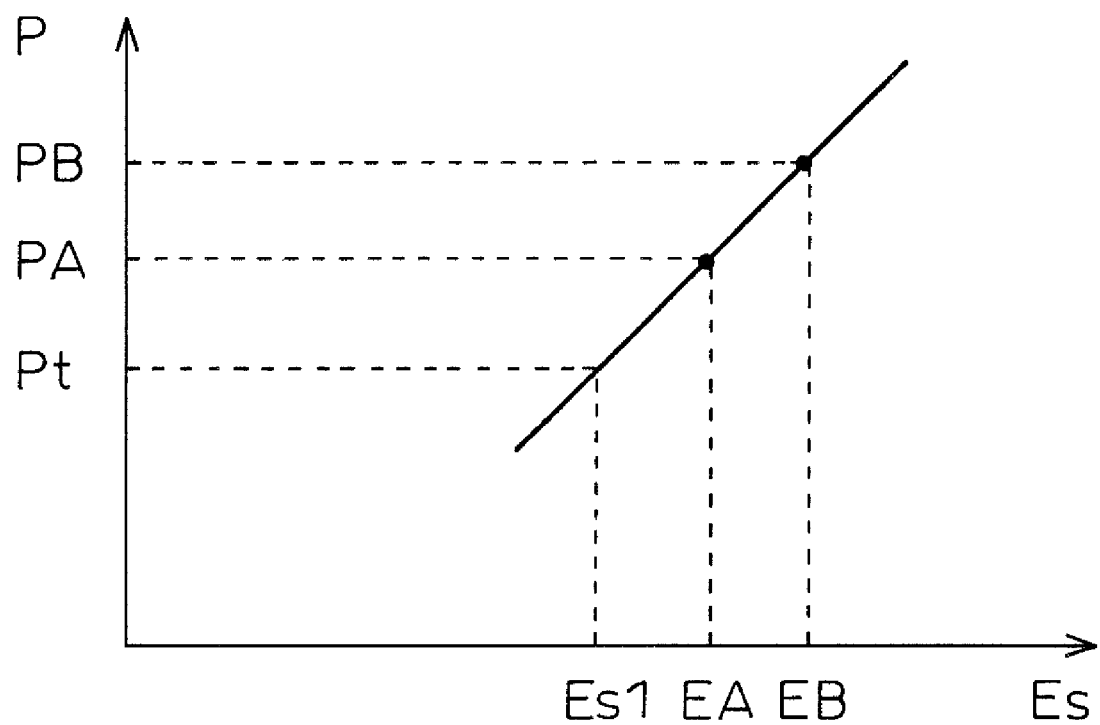
FIG. 9 is a diagram illustrating a relationship between the excitation energy Es injected into the second laser excitation region and the laser power P.

Alternatively, it is also effective to correct the laser power before performing the laser processing by using the laser from laser device 1. FIG. 9 is a diagram illustrating a relationship between the excitation energy Es injected into the second laser excitation region and the laser power P.

First, high frequency power supply unit PSU1 gives the excitation energy Em to the first laser excitation region A. Then, the laser power PA when the energy EA is injected from high frequency power supply unit PSU2 and the laser power PB when the energy EB is injected are obtained. As a result, an power characteristic line illustrated in FIG. 9 is calculated. By using this line, the injection excitation energy Esl necessary for the laser power Pt illustrated in FIG. 9 can be calculated. This calculation is performed by command computation section 12 of CNC 10. By using the injection excitation energy Esl obtained as described above, the stable laser power Pt can be obtained and, as a result, the laser processing can be performed with little variation.

Further, by using the technique described above, correction may be performed so that the injection excitation energy Es in the data table set forth in Table 1 is replaced with the excitation energy Esl. As a result, the laser power can be fine-tuned more accurately without changing the commands on the programs of CNC 10.

In the embodiments described above, the creation of the command value of the excitation energy is described. But, when the amount of the excitation energy is actually instructed, the instruction may be based on voltage or current applied to discharge tube 26 or a ratio to the maximum injection energy.

EFFECT OF THE INVENTION

In the first aspect, the first energy is set to be equal to or higher than the critical injection energy and the second energy is set to be between the preliminary excitation energy and the critical injection energy. As a result, only the second energy is changed to reduce the rate of change of the laser power. Consequently, even in the case of the high power laser device, the laser power can be stably fine-tuned, in particular, in the region in which the laser power is relatively low.

In the second aspect, the energy is input in a pulse-like manner between the first energy that is equal to or higher than the critical injection energy and the second energy that is between the preliminary excitation energy and the critical injection energy. As a result, only the second energy is changed to reduce the rate of change of the laser power. Consequently, even in the case of the high power laser device, the laser power can be stably fine-tuned, in particular, in the region in which the laser power is relatively low. The second aspect is particularly advantageous in the case of the single laser region.

In the third aspect, even when the second energy is relatively high, the laser power can be stably fine-tuned.

In the fourth aspect, by using the data table, the second energy can be easily determined.

In the fifth aspect, by updating the second energy, the laser power can be fine-tuned more accurately.

Although the invention has been shown and described with exemplary embodiments thereof, it should be understood by those skilled in the art that the foregoing and various other changes, omissions and additions may be made therein and thereto without departing from the spirit of the scope of the invention.

The invention claimed is:

1. A laser device comprising:
    first and second laser excitation regions that are disposed in series each other;
    a first power supply unit that injects a first energy into said first laser excitation region; and
    a second power supply unit that injects a second energy into said second laser excitation region,
    wherein said first power supply unit injects a predetermined excitation energy equal to or higher than a critical injection energy at which laser oscillation starts into said first laser excitation region as the first energy, said second power supply unit injects energy between a preliminary excitation energy needed for preliminary discharge in the laser excitation region and said critical injection energy into said second laser excitation region as the second energy and only the second energy is changed while the first energy is fixed, so as to control laser power.

2. A laser device according to claim 1, wherein said second energy is set by adding or subtracting a predetermined offset excitation energy to/from said preliminary excitation energy.

3. A laser device according to claim 1, further comprising a storage section that stores, as a data table or function, a corresponding relationship between a target value of the laser power, said first energy, and said second energy determined according to said target value of the laser power and said first energy,
    wherein said second energy is determined based on said target value of the laser power, the first energy set forth in programs for operating said laser device, and the data table or function stored by said storage section.

4. A laser device according to claim 1, further comprising:
    a command creation section that creates command values of said first and second energies corresponding to a target value of the laser power;
    a power detection section that obtains a detection value of the laser output from said laser device; and
    a command computation section that updates the command value of said second energy according to a predetermined computation based on the command values of said first and second energies created by said command creation section and the detection value of the laser detected by said power detection section.

* * * * *